United States Patent Office 3,808,293
Patented Apr. 30, 1974

3,808,293
VINYL CHLORIDE POLYMER, ACRYLIC POLYMER AND ACRYLONITRILE/BUTADIENE/STYRENE POLYMER COMPOSITIONS

William Emmett Garrison, Jr., Wilmington, Del., assignor to E. I. du Pont de Nemours and Company, Wilmington, Del.
No Drawing. Filed Jan. 5, 1972, Ser. No. 215,680
Int. Cl. C08f 15/28
U.S. Cl. 260—876 R
6 Claims

ABSTRACT OF THE DISCLOSURE

A composition of (A) 60 to 80 percent by weight of polymeric components vinyl chloride polymer, (B) 10 to 21 percent by weight of polymeric components acrylonitrile/butadiene/styrene polymer, and (C) 15 to 30 percent by weight of polymeric components acrylic polymer comprising 75 to 100 percent by weight methyl methacrylate polymerized units and 0 to 25 percent by weight lower alkyl acrylate polymerized units; the composition being useful for molding and extrusion, particularly into sheets which are easily thermoformable into various articles.

---

This invention relates to a composition which consists essentially of vinyl chloride polymer, acrylonitrile/butadiene/styrene polymer and acrylic polymer. Particularly, this invention relates to a composition which consists essentially of 60 to 80 percent by weight of polymeric components vinyl chloride polymer, 10 to 21 percent by weight of polymeric components acrylonitrile/butadiene/styrene polymer and 15 to 30 percent by weight of polymeric components acrylic polymer.

It is known that blends of polyvinyl chloride, acrylic polymers and chlorinated polyethylene can be prepared. (U.S.P. 3,316,192). Such blends suffer from the following deficiencies: (1) articles molded from the blends have "gate smear," i.e., the surface of the articles are rough at the gate of the die; (2) articles prepared from the blends delaminate on bending; and (3) delamination frequently occurs on weathering at stress points in articles made therefrom. It is also known that blends of polyvinyl chloride and acrylonitrile/butadiene/styrene copolymer can be prepared. (U.S.P. 3,312,756).

A composition has been found which does not have the deficiencies set forth above and has better physical properties than those of the blends discussed above. It is a composition consisting essentially of (A) 60 to 80 percent by weight of polymeric components of a vinyl chloride poymer containing at least 85 percent by weight vinyl chloride polymerized units; (B) 10 to 21 percent by weight of polymeric components of an acrylonitrile/butadiene/styrene polymer formed by polymerizing a mixture comprising a styrene monomer and an acrylonitrile monomer with a latex of a synthetic elastomer containing at least 85 percent by weight of polymerized butadiene, the polymer consisting essentially of 30 to 65 percent by weight butadiene polymerized units, 25 to 55 percent by weight styrene polymerized units and 5 to 20 percent by weight acrylonitrile polymerized units; and (C) 15 to 30 percent by weight of polymeric components of an acrylic polymer comprising 75 to 100 percent by weight methyl methacrylate polymerized units and 0 to 25 percent by weight lower alkyl acrylate polymerized units.

Injection molded bars of the composition of this invention normally have a notched Izod impact strength of at least 3 ft.-lb./in. at 20° C. according to ASTM D-256. Preferably, it is above 10. Heat deflection temperature according to ASTM D-648 is at least 70° C. Tensile strength of the composition according to ASTM D-638 is at least 6000 p.s.i. The U.L. flammability of the composition tested in accordance with the method outlined in Underwriters' Lab Bulletin 94, May, 1971 is self-extinguishing, group 1 or preferably group 0.

Inclusion of the vinyl chloride polymer in the composition renders the composition flame retardant. The vinyl chloride polymer is at least 85 percent by weight, preferably 100 percent by weight vinyl chloride polymerized units. Inherent viscosity of the vinyl chloride polymer should be from 0.50 to 1.2, preferably 0.65 to 1.0 by ASTM D-1243-66. Normally available vinyl chloride polymers or copolymers can be utilized. The preferred amount of the vinyl chloride polymer in the composition based on polymeric components is 61 to 65 percent by weight.

The acrylonitrile/butadiene/styrene polymer is preferably 13 to 16 percent by weight of the polymeric components of the composition. It is prepared by standard techniques which involve polymerizing a mixture comprising styrene monomer and acrylonitrile monomer with latex of a synthetic elastomer containing at least 85 percent by weight polymerized butadiene. The polymer normally consists essentially of 30 to 65 percent by weight, preferably 38 to 48 percent by weight butadiene polymerized units, 25 to 55 percent by weight, preferably 35 to 45 percent by weight styrene polymerized units and 5 to 20 percent by weight, preferably 12 to 20 percent by weight acrylonitrile polymerized units. A most preferred acrylonitrile/butadiene/styrene polymer is one which is 70 percent by weight of a rubber phase which comprises 68 percent by weight rubber which is 10 percent by weight styrene polymerized units and 90 percent butadiene polymerized units and 32 percent by weight graft styrene/acrylonitrile copolymer which is 66 percent by weight styrene polymerized units and 34 percent by weight acrylonitrile polymerized units; 25 percent by weight of styrene/acrylonitrile copolymer matrix which is 68 percent by weight styrene polymerized units and 32 percent by weight acrylonitrile polymerized units; and 5 percent by weight of a mixture of stearic acid and p-alkyl phenol. Normally, the synthetic elastomer of the acrylonitrile/butadiene/styrene polymer is at least 90 percent by weight butadiene polymerized units.

The acrylonitrile/butadiene/styrene polymer is incorporated in the composition to give the composition its high impact strength while maintaining a relatively high tensile strength and modulus. It is sufficiently compatible with the polyvinyl chloride and acrylic components so that articles made therefrom do not delaminate when stressed.

Acrylic polymer is also included in the composition. It is included to improve the processability and deep draw thermoformability of the composition. Acrylic polymer normally utilized has an inherent viscosity of from 0.3 to 0.6. The inherent viscosity of the acrylic polymers is measured in a Cannon-Fenske Number 50 viscometer on a solution of 0.50 g. of polymer per 100 ml. of solution in chloroform and a temperature of 20° C.

$$\text{Inherent viscosity} = \frac{2.303 \log \eta r}{c}$$

where $$\eta r = \frac{\text{flow time for solution}}{\text{flow time for solvent}}$$

c = grams of polymer per 100 ml. of solution.

It is preferred that the acrylic polymer contain 1 to 15 percent by weight of the lower alkyl acrylates, i.e., methyl ethyl, propyl or butyl. Etheyl is most preferred. The preferred amount of the acrylic polymer in the composition is 21 to 26 percent by weight of polymeric components.

An inhibitor is normally included in the composition to prevent the dehydrochlorination of the vinyl chloride polymer. Useful inhibitors include the following classes of compounds: (A) dialkyl tin mercaptides, such as dibutyl tin mercaptide; acetates, such as dipropyl tin diacetate and dibutyl tin diacetate; laurates, such as dibutyl tin dilaurate; maleates, such as dibutyl tin maleate; and alkoxides, such as dibutyl tin alkoxide having 1 to 10 carbon atoms in each alkyl group; fatty acid salts of metals of the class consisting of zinc, lead, cadmium, calcium and strontium having 7 to 24 carbon atoms, such as the palmitate, stearate and laurate salts of these metals; barium phenolates; and dialkyl zinc mercaptides having 1 to 10 carbon atoms, such as dibutyl zinc mercaptide; (B) epoxidized oils having 10 to 100 carbon atoms and an oxirane oxygen content of 5 to 10 percent by weight of the oil, such as lard oil, olive oil, castor oil, peanut oil, cottonseed oil, soybean oil, corn oil, linseed oil and menhaden oil; diglycidyl ethers of polyhydric phenols having 17 to 50 carbon atoms, such as diglycidyl ether of hydroquinone; and 3,4-epoxy-6-methyl-cyclohexylmethyl-3,4-epoxy-6-methyl cyclohexane carboxylate; and (C) organic phosphites of the class of alkyl phosphites having 1 to 20 carbon atoms, such as trimethyl phosphite and triphenyl phosphite. Normally, the amount of inhibitor used is between 2 and 10 parts per 100 parts by weight of the vinyl chloride polymer; although greater amounts of inhibitor are satisfactory.

In addition to the polymeric components and inhibitor recited above, the composition can include other stabilizers which are normally present in acrylic polymers and acrylonitrile/butadiene/styrene polymers, lubricants, etc. Pigments can also be included in the composition. Such are normally present at from 0.5 to 15 percent by weight, preferably 1.5 to 3 percent by weight of the composition. A frequently used pigment is titanium dioxide. It can be used singly or with other pigments.

The composition is an intimate blend of the components recited above and is prepared by conventional methods which include blending the components on an extruder, hot roll mill, etc. The composition can be molded or extruded into various objects. Sheets extruded from the composition of this invention are easily thermoformed into articles such as housings, furniture, bins, etc. The articles prepared are normally translucent.

The following examples are meant to illustrate but not to limit the invention. All parts and percentages are by weight unless otherwise specified. The tests which are referred to were performed by the methods set forth above. Flexural strength and modulus were determined according to ASTM D-790. Rockwell hardness was determined according to ASTM D-785-60T. Elongation was determined according to ASTM D-638.

EXAMPLE I

A composition was prepared by blending in a Littleford Lodige blender, model FM 1300, Littleford Brothers, Cincinnati, Ohio, 62 parts polyvinyl chloride homopolymer (inherent viscosity=0.94), 23 parts of a copolymer of 95.5 percent by weight methyl methacrylate polymerized units and 4.5 percent by weight ethyl acrylate polymethyl, propyl or butyl. Ethyl is most preferred. The 311 acrylonitrile/butadiene/styrene resin (Marbon Division, Borg-Warner Corporation, Washington, W. Va. 26181), ("Blendex" 311 acrylonitrile/butadiene/styrene resin is 70 percent by weight of a rubber phase which compises 68 percet by weight rubber which is 10 percent by weight styrene polymerized units and 90 percent butadiene polymerized units and 32 percent by weight graft styrene/acrylonitrile copolymer which is 66 percent by weight styrene polymerized units and 34 percent by weight acrylonitrile polymerized units; 25 percent by weight of styrene/acrylonitrile copolymer matrix which is 68 percent by weight styrene polymerized units and 32 percent by weight acrylonitrile polymerized units; and 5 percent by weight of a mixture of stearic acid and p-alkyl phenol), 2 parts octadecyl alcohol, 2 parts "Thermolite" 24, 0.25 part "Thermolite" 14 ("Thermolite" 13 and 24 are solid organotin maleate polyvinyl chloride stabilizers sold by M & T Chemicals, Rahway, N.J.) and 5.45 parts "Ti-Pure" R-960 titanium dioxide (E. I. du Pont de Nemours and Company). This blend was extruded with vacuum extraction and pelletized on a modified 28 mm. Werner and Pfleiderer ZSK extruder. The barrel temperature of the extruder was 165° C. at the rear, 179° C. at the front and 195° C. at the die. The melt temperature was 249° C. The pellets were molded into test bars on a 3 oz. Van Dorn reciprocating screw injection molding machine equipped with a "vinyl" screw. The temperature of the melt was 209° C. The properties of the composition are listed in Table I.

TABLE I

| | |
|---|---|
| Specific gravity | 1.30 |
| Tensile strength, p.s.i.[1] | 7760 |
| Elongation, percent | 40 |
| Flex modulus, p.s.i. | 427,000 |
| Flex strength, p.s.i. | 13,000 |
| Hardness R, Rockwell | 112 |
| Notched Izod, ⅛", ft.-lb./in.: | |
| 24° C. | 10.5 |
| 0° C. | 2.5 |
| −18° C. | 1.6 |
| −30° C. | 1.2 |
| −40° C. | 0.9 |
| Heat deflection temp., ° C. at 264 p.s.i.[2] | 75 |

Flammability, UL vertical: Self-extinguishing.
Burning test, ⅛": Group 0.

[1] Pulled at 0.2″/minute.
[2] Annealed 2 hrs. at 65° C.

EXAMPLE II

A composition was prepared following the procedure of Example I except for the following changes:

(1) 26 parts of the methyl methacrylate/ethyl acrylate copolymer were used;
(2) 12 parts of the "Blendex" 311 were used;
(3) No titanium dioxide was used;
(4) 1.50 parts of "Thermolite" 24 were used;
(5) 0.17 part of "Thermolite" 13 was used; and
(6) 2.2 parts of octadecyl alcohol were used.

The composition had the properties shown in Table II.

TABLE II

| | |
|---|---|
| Tensile strength, p.s.i.[1] | 7570 |
| Elongation, percent | 23 |
| Flex modulus, p.s.i. | 403,000 |
| Flex strength, p.s.i. | 12,400 |
| Hardness R, Rockwell | 114 |
| Notched Izod, ⅛", ft.-lb./in., 24° C. | 5.1 |

[1] Pulled at 0.2″/minute.

EXAMPLE III

A composition was prepared following the procedure of Example I except for the following changes:

(1) 2.1 parts of octadecyl alcohol were used;
(2) 1.35 parts "Thermolite" 24 were used;
(3) 0.15 part "Thermolite" 13 was used; and
(4) No titanium dioxide was used.

The composition had the properties shown in Table III.

TABLE III

| | |
|---|---|
| Specific gravity | 1.26 |
| Tensile strength, p.s.i.[1] | 7400 |
| Elongation, percent | 75 |
| Flex modulus, p.s.i. | 380,000 |
| Flex strength, p.s.i. | 11,400 |
| Hardness R, Rockwell | 111 |
| Notched Izod, 1/8", ft.-lb./in., 24° C. | 17.4 |
| Heat deflection temp., °C. at 264 p.s.i.[2] | 75 |

[1] Pulled at 0.2"/minute.
[2] Annealed 2 hrs. at 65° C.

Flammability, UL vertical burning test, 1/8", self-extinguishing Group 0.

EXAMPLE IV

A composition was prepared following the procedure of Example I except for the following changes:

(1) 63 parts of polyvinyl chloride were used;
(2) 19 parts of the methyl methacrylate/ethyl acrylate copolymer were used;
(3) 18 parts of "Blendex" 311 were used;
(4) 3 parts of the titanium dioxide were used; and
(5) 1 parts of octadecyl alcohol was used.

The composition had the properties shown in Table IV.

TABLE IV

| | |
|---|---|
| Specific gravity | — |
| Tensile strength, p.s.i.[1] | 7350 |
| Elongation, percent | 71 |
| Flex modulus, p.s.i. | 412,000 |
| Flex strength, p.s.i. | 11,800 |
| Hardness R, Rockwell | 110 |
| Notched Izod, 1/8" ft.-lb./in.: | |
| 24° C. | 18.0 |
| 0° C. | 4.2 |
| −18° C. | 1.9 |
| −30° C. | 1.9 |
| −40° C. | 1.2 |

Flammability, UL vertical: Self-extinguishing.
Burning test, 1/8": Group 0.

[1] Pulled at 0.2"/minute.

What is claimed is:

1. A composition consisting essentially of (A) 60 to 65 percent by weight of polymeric components of a vinyl chloride homopolymer having an inherent viscosity of 0.5 to 1.2 according to ASTM D-1243-66; (B) 10 to 21 percent by weight of polymeric components of an acrylonitrile/butadiene/styrene polymer formed by polymerizing comprising a styrene monomer an acrylonitrile monomer with a latex of a synthetic elastomer containing at least 85 percent by weight of polymerized butadiene, the polymer consisting essentially of 30 to 65 percent by weight butadiene polymerized units, 25 to 55 percent by weight styrene polymerized units and 5 to 20 percent by weight acrylonitrile polymerized units; and (C) 15 to 30 percent by weight of polymeric components of an acrylic polymer comprising 75 to 100 percent by weight methyl methacrylate polymerized units and 0 to 25 percent by weight lower alkyl acrylate polymerized units.

2. The composition of claim 1 which is 61 to 65 percent by weight of polymeric components of vinyl chloride polymer, 13 to 16 percent by weight of polymeric components of acrylonitrile/butadiene/styrene polymer, and 21 to 26 percent by weight of polymeric components of acrylic polymer.

3. The composition of claim 2 in which the acrylic polymer is 1 to 15 percent by weight lower alkyl acrylate polymerized units and 85 to 99 percent by weight methyl methacrylate polymerized units.

4. The composition of claim 3 in which the lower alkyl acrylate is ethyl acrylate.

5. The composition of claim 4 in which the acrylonitrile/butadiene/styrene polymer is 38 to 48 percent by weight butadiene polymerized units, 35 to 45 percent by weight styrene polymerized units and 12 to 20 percent by weight acrylonitrile polymerized units.

6. The composition of claim 5 in which the vinyl chloride polymer has an inherent viscosity of 0.65 to 1.0.

References Cited

UNITED STATES PATENTS

| | | | |
|---|---|---|---|
| 3,170,964 | 2/1965 | Grabowski | 260—876 R |
| 3,177,268 | 4/1965 | Frazer et al. | 260—876 R |
| 3,316,192 | 4/1967 | Seibel | 260—23 AR |
| 3,470,116 | 9/1969 | Praetzel et al. | 260—45.7 R |

MURRAY TILLMAN, Primary Examiner

J. ZIEGLER, Assistant Examiner

U.S. Cl. X.R.

260—23.7 H, 45.7 S, P

UNITED STATES PATENT OFFICE
CERTIFICATE OF CORRECTION

Patent No. 3,808,293   Dated April 30, 1974

Inventor(s) WILLIAM EMMETT GARRISON, JR.

It is certified that error appears in the above-identified patent and that said Letters Patent are hereby corrected as shown below:

Claim 1, Col. 6, line 4 - "a mixture" was omitted before "comprising"

Claim 1, Col. 6, line 4 - After "monomer", insert "and".

Signed and sealed this 1st day of October 1974.

(SEAL)
Attest:

McCOY M. GIBSON JR.
Attesting Officer

C. MARSHALL DANN
Commissioner of Patents